(12) United States Patent
Li

(10) Patent No.: US 12,717,738 B2
(45) Date of Patent: Aug. 25, 2026

(54) SYSTEMS FOR DATA WRITING AND READING USING DUAL DIRECT MEMORY ACCESS (DMA) CONTROLLERS AND BATCH PROCESSING

(71) Applicant: SHENZHEN SHOKZ CO., LTD., Shenzhen (CN)

(72) Inventor: Bocheng Li, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/432,099

(22) Filed: Feb. 5, 2024

(65) Prior Publication Data

US 2024/0176753 A1 May 30, 2024

Related U.S. Application Data

(63) Continuation of application No. PCT/CN2022/093686, filed on May 18, 2022.

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC ...................................................... G06F 13/28
USPC .......................................................... 710/22
See application file for complete search history.

(56) References Cited

U.S. PATENT DOCUMENTS 5,553,220 A * 9/1996 Keene ...................... H04N 7/04 345/531
5,634,099 A * 5/1997 Andrews ................ G06F 13/28 710/24
6,330,626 B1 * 12/2001 Dennin ................ G06F 3/0656 710/52
7,818,389 B1 * 10/2010 Chiang ................ H01M 4/925 709/212

(Continued)

FOREIGN PATENT DOCUMENTS

CN 101493755 A 7/2009
CN 103399720 A 11/2013

(Continued)

OTHER PUBLICATIONS

International Search Report in PCT/CN2022/093686 mailed on Dec. 19, 2022, 7 pages.

(Continued)

*Primary Examiner* — Titus Wong
(74) *Attorney, Agent, or Firm* — METIS IP LLC

(57) ABSTRACT

The present disclosure provides systems for controlling signal transmission. The system may include a first direct memory access (DMA) controller, a processor, and a second DMA controller: The first DMA controller may be configured to write a signal to a first storage space to form first data. The processor may be configured to process the first data in batches and transmit the processed first data to a second storage space to form second data. The second DMA controller may be configured to sequentially read the second data from an address of the second storage space. When each batch of first data is written to the second storage space, a data reading address of the second DMA controller in the second storage space may point to an address before an address where the first data is written.

16 Claims, 3 Drawing Sheets

(56) References Cited

U.S. PATENT DOCUMENTS

| | | | | |
|---|---|---|---|---|
| 2004/0123013 | A1* | 6/2004 | Clayton | G06F 11/1004<br>710/308 |
| 2007/0033302 | A1* | 2/2007 | Lin | G06F 13/28<br>710/22 |
| 2008/0112012 | A1* | 5/2008 | Yokoyama | H04N 1/0473<br>358/3.03 |
| 2010/0180095 | A1* | 7/2010 | Fujibayashi | G06F 5/14<br>711/E12.091 |
| 2012/0331186 | A1* | 12/2012 | Nagai | G06F 13/28<br>710/22 |
| 2013/0111079 | A1* | 5/2013 | Ben Abdallah | G06F 13/28<br>710/23 |
| 2015/0046634 | A1* | 2/2015 | Maeda | G06F 12/0868<br>711/103 |
| 2015/0143031 | A1* | 5/2015 | Lu | G06F 12/0246<br>711/103 |
| 2016/0291868 | A1* | 10/2016 | Halaharivi | G06F 12/0246 |
| 2017/0004101 | A1* | 1/2017 | Shao | G06F 12/0806 |
| 2019/0155545 | A1* | 5/2019 | Kim | G06F 3/061 |
| 2019/0347212 | A1* | 11/2019 | Chen | G06F 13/28 |
| 2020/0310986 | A1 | 10/2020 | Kang | |
| 2020/0327079 | A1 | 10/2020 | Zhao et al. | |
| 2021/0255977 | A1 | 8/2021 | Kiyota et al. | |
| 2021/0326075 | A1* | 10/2021 | Kim | G06F 3/0679 |
| 2022/0012201 | A1* | 1/2022 | Schaub | G06F 13/28 |
| 2022/0236911 | A1* | 7/2022 | Jones | G06F 3/0679 |
| 2024/0176753 | A1 | 5/2024 | Li | |

FOREIGN PATENT DOCUMENTS

| | | | |
|---|---|---|---|
| CN | 105183665 | A | 12/2015 |
| CN | 107564265 | A | 1/2018 |
| CN | 112506437 | A | 3/2021 |
| CN | 117130956 | A | 11/2023 |

OTHER PUBLICATIONS

Written Opinion in PCT/CN2022/093686 mailed on Dec. 19, 2022, 6 pages.

* cited by examiner

SYSTEMS FOR DATA WRITING AND READING USING DUAL DIRECT MEMORY ACCESS (DMA) CONTROLLERS AND BATCH PROCESSING

CROSS-REFERENCE TO RELATED APPLICATION

This application is a continuation of International Application No. PCT/CN2022/093686, filed on May 18, 2022, the entire contents of which are hereby incorporated by reference.

TECHNICAL FIELD

The present disclosure relates to the field of signal transmission and control, and in particular, to systems for controlling signal transmission.

BACKGROUND

A hearing aid refers to a sound amplification device that may be used by a hearing-impaired person to compensate for hearing loss and improve the speech communication ability of the hearing impaired person.

As a real-time audio device, the hearing aid may need to process a sound signal acquired by a microphone and play the sound signal back to a user through a speaker timely. In the process, reading and writing of data in a storage space and processing of data by a processor may often lead to a signal delay, which may directly affect the performance of a product and the user experience. Therefore, it is desirable to provide methods or systems that can optimize a reading and writing mechanism of the hearing aid signal and reduce the signal delay.

SUMMARY

Embodiments of the present disclosure provide a system for controlling signal transmission. The system may include a first direct memory access (DMA) controller, a processor, and a second DMA controller. The first DMA controller may be configured to write a signal to a first storage space to form first data. The processor may be configured to process the first data in batches and transmit the processed first data to a second storage space to form second data. The second DMA controller may be configured to sequentially read the second data from an address of the second storage space. When each batch of the first data is being written to the second storage space, a data reading address of the second DMA controller in the second storage space may point to an address before an address where the first data is being written.

In some embodiments, the first DMA controller may periodically write the signal to the first storage space in a circular buffering manner.

In some embodiments, addresses of the first storage space and addresses of the second storage space may have a mapping relationship, and the processor may write the processed first data to the second storage space according to the mapping relationship.

In some embodiments, the addresses of the first storage space may have two or more segments arranged in sequence, each segment of the two or more segments corresponding to each batch when the first data is processed in batches.

In some embodiments, the addresses of the second storage space may have two or more segments arranged in sequence, and the mapping relationship may include: a current segment of the addresses of the first storage space corresponding to a next segment of the addresses of the second storage space.

In some embodiments, the processor may be further configured to send a first instruction to the first DMA controller to control the first DMA controller to write first sub-data to the first storage space at a first time and send a second instruction to the second DMA controller to control the second DMA controller to read second sub-data corresponding to the first sub-data in the second storage space at a second time. An interval between the second time and the first time may be greater than or equal to a total time for each batch of first data to be written to the first storage space.

In some embodiments, the interval between the second time and the first time may be greater than or equal to a sum of the total time for each batch of the first data to be written to the first storage space and a time for the processor to process each batch of the first data.

In some embodiments, the second instruction may be configured to control the second DMA controller to advance or delay a time when the second DMA controller starts to work relative to the first DMA controller.

In some embodiments, the processor may be configured to determine a time when the first DMA controller starts to work and a time when the second DMA controller starts to work, respectively, determine a mapping relationship between addresses of the first storage space and addresses of the second storage space based on the time when the first DMA controller starts to work and the time when the second DMA controller starts to work, and write the processed first data to the second storage space according to the mapping relationship.

In some embodiments, before each batch of the first data is written to the second storage space, the processor may read a current data reading address of the second storage space and determine, based on the current data reading address, a writing address where each batch of the first data is to be written.

In some embodiments, the signal may include a sound signal obtained by a microphone, and the second DMA controller may transmit the second data that are sequentially read from the second storage space to a speaker.

In some embodiments, the processing the first data in batches may include performing at least one of an analog to digital (A/D) conversion operation, an amplification operation, an encoding operation, a decoding operation, a packing operation, or a caching operation on the first data.

In some embodiments, the signal may include an image obtained by an image obtaining device, and the second DMA controller may transmit the second data that are sequentially read from the second storage space to a display.

In some embodiments, the processing the first data in batches may include performing at least one of a filtering operation, a transforming operation, an encoding operation, a segmenting operation, an identifying operation, or a caching operation on the first data.

In some embodiments, a distance between the data reading address of the second DMA controller in the second storage space and the address where the first data is being written may be smaller than or equal to a length of each batch of the first data.

Additional features are partially illustrated below and become obvious to those skilled in the art by reference to the following and the accompanying drawings, or may be understood by the production or operation of examples. Features of the present disclosure may be realized and obtained by practicing or using aspects of the manners, tools, and combinations set forth in the detailed examples below.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
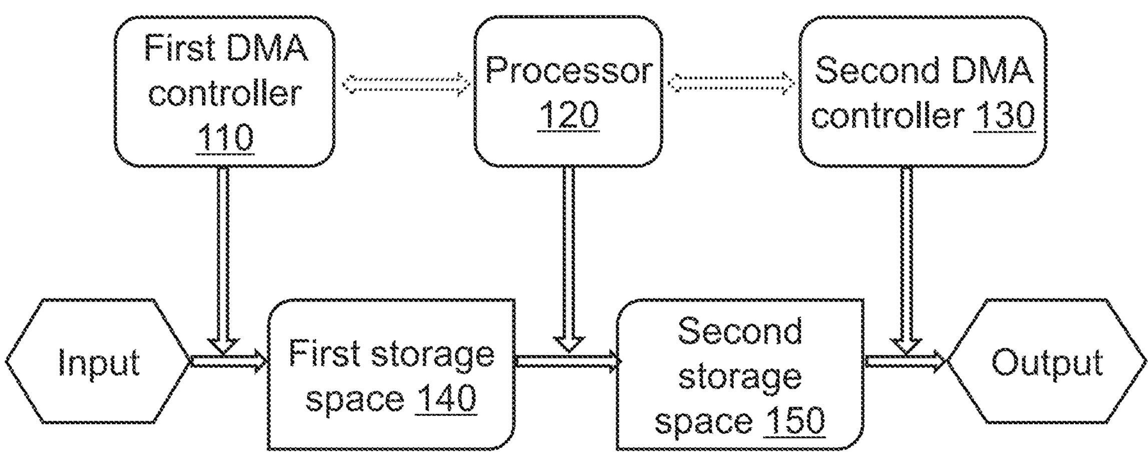
FIG. 1 is a schematic diagram illustrating a system for controlling signal transmission according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. It should be understood that these exemplary embodiments are given only to enable those skilled in the art to better understand and realize the present disclosure, and are not intended to limit the scope of the present disclosure in any way. Unless obviously obtained from the context or the context illustrates otherwise, the same numeral in the drawings refers to the same structure or operation.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment"; and the term "another embodiment" means "at least one other embodiment".

In the description of the present disclosure, it is understood that the terms "first," "second," etc. are used only for the purpose of illustration and are not to be understood as indicating or implying relative importance or implicitly specifying the number of technical features indicated. The terms "first," "second," etc. are used only for descriptive purposes and are not to be understood as indicating or implying relative importance or implicitly specifying the number of technical features indicated. Therefore, features that are defined by "first," "second," etc. may expressly or implicitly include at least one of the features. In the description of the present disclosure, "a plurality of" means at least two, e.g., two, three, etc., unless explicitly and specifically limited otherwise.

To better understand the system for controlling signal transmission of the present disclosure, the following descriptions are based on a process for controlling signal transmission associated with a hearing aid. It should be noted that the following descriptions based on the process for controlling signal transmission associated with the hearing aid are not intended to limit the scope of the present disclosure. For those skilled in the art, the system disclosed in the present disclosure may be applied to any other system and/or device that requires signal and/or data transmission. For example, the embodiments of the present disclosure may also be used in a process of real-time obtaining, processing, and display of image or video information. As another example, the embodiments of the present disclosure may also be used in a transmission process of any real-time signal such as a mechanical signal or an electromagnetic signal.

The hearing aid may include a microphone (also referred to as a mike or a voice tube), an amplifier, and a speaker (also referred to as a receiver or an earphone). The microphone may receive a sound signal and convert the received sound signal into an electrical signal (i.e., convert sound energy into electrical energy). The amplifier may include an amplification circuit, and the amplifier may be configured to amplify the electrical signal. The speaker may convert the electrical signal into the sound signal (i.e., convert the electrical energy into the sound energy) and output the sound signal to a user (e.g., a person who is hearing impaired).

In some embodiments, the hearing aid may further include a Direct Memory Access (DMA) on an input side, a processor, and a DMA on an output side. The DMA on the input side may periodically read the signal captured by the microphone and transmit the captured signal to a certain position in a first storage space. The processor may transmit a frame of data consisting of m signals from the first storage space to a certain position in a second storage space at once every N signal times. In some embodiments, N may be equal to m. The DMA on the output side may periodically read the signal stored in the second storage space and transmit the signal to the speaker.

For a real-time audio device such as the hearing aid, a signal delay may directly affect the performance of a product and the user experience. In some embodiments, the DMAs on the input and output sides may usually write and read the signal using a circular buffering manner, i.e., write and read the signal in a certain manner, respectively. Moreover, due to a time difference between signal writing, transportation, and reading, the signal written to the input side may need to wait for a relatively long time to be read by the DMA on the output side, which results in a relatively large signal transmission delay. Additionally, the time differences between signal writing and reading in different signal transmission processes may be different, which results in fluctuations in signal transmission delay and affects the stability of the system. In the traditional technology, an operation mechanism between the DMA on the input side, the processor, and the DMA on the output side is not optimized, so the performance of the traditional hearing aid in terms of signal delay may need to be improved.

In view of the above problems, the embodiments of the present disclosure provide a system for controlling signal transmission. The system may be applied to the real-time audio device, such as the hearing aid, to optimize a signal reading and writing mechanism by coupling the operation mechanism between the DMA on the input side, the processor, and the DMA on the output side to improve the output signal delay. It should be noted that the system for controlling signal transmission provided by the embodiments of the present disclosure may be applied to, but is not limited to, the hearing aid. For example, the embodiments of the present disclosure may also be used in a process of real-time obtaining, processing, and display of image or video information. As another example, the embodiments of the present disclosure may also be used in a transmission process of any real-time signal such as a mechanical signal or an electromagnetic signal.

The system for controlling signal transmission provided by the embodiments of the present disclosure is described in detail below in connection with the accompanying drawings.

FIG. 1 is a schematic diagram illustrating a system for controlling signal transmission according to some embodiments of the present disclosure.

Referring to FIG. 1, in some embodiments, the system 100 for controlling signal transmission may include a first DMA controller 110, a processor 120, a second DMA controller 130, a first storage space 140, and a second storage space 150.

The first DMA controller 110 may be configured to control data transmission between an external device and the first storage space 140. For example, the first DMA controller 110 may read an input signal in the external device and write the input signal to the first storage space 140 to form first data. Merely by way of example, the external device may include a microphone, and the input signal may include a sound signal captured by the microphone. The first storage space 140 may be system memory. In some embodiments, the first data refers to data or information obtained after the sound signal is converted into an electrical signal. In some embodiments, the first data may be obtained by encoding the electrical signal corresponding to the sound signal captured by the microphone. In some embodiments, the external device may include an image obtaining device (e.g., an image sensor), and the input signal may include image or video frame data obtained by the image obtaining device. In some embodiments, the external device may include a device configured to obtain or generate a mechanical signal or an electromagnetic signal, and the input signal may include the mechanical signal or the electromagnetic signal.

In some embodiments, the first DMA controller 110 may directly control the data transmission between the external device and the first storage space 140. For example, the first DMA controller 110 may read the input signal captured by the microphone based on a DMA technology and write the input signal to a specified position in the first storage space 140 to form the first data. The DMA technology refers to an interface technology in which the external device directly exchanges data with the system memory (e.g., the first storage space 140 in the system 100 for controlling signal transmission) without through a central processing unit (e.g., the processor 120 in the system 100 for controlling signal transmission). Merely by way of example, when the data is transmitted, the first DMA controller 110 may send a DMA request signal that requests to use a system bus to the central processing unit. After the end of a current bus cycle, the central processing unit may hand over the system bus and send a DMA confirmation signal to the first DMA controller 110 to make the first DMA controller 110 to take over the system bus, which may realize the data transmission between the external device and the first storage space 140. The first DMA controller 110 may also determine whether the data transmission process is over and send a DMA end signal to the central processing unit to make the central processing unit to take over the system bus again.

In some embodiments, the first DMA controller 110 may also realize the data transmissions between the external device and the first storage space 140 under the control of the processor 120. For example, the first DMA controller 110 may, under the control of the processor 120, read the input signal captured by the microphone and write the input signal to the specified position in the first storage space 140 to form the first data. Merely by way of example, the processor 120 may generate an instruction configured to control the first DMA controller 110 and control the data reading and/or writing process of the first DMA controller 110 through the instruction. For example, the instruction may be configured to control a working time of the first DMA controller 110, so that the first DMA controller 110 may start a data reading and/or writing operation at a specified time.

The first storage space 140 may be any storage device configured to store data and/or other information. In some embodiments, the first storage space 140 may include a mass storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, an optical disk, a memory card, a zip disk, a magnetic tape, etc. Exemplary volatile read-only memory may include a random-access memory (RAM). Exemplary RAM may include a dynamic RAM (DRAM), a double rate synchronous dynamic RAM (DDR SDRAM), a static RAM (SRAM), a thyristor RAM (T-RAM), and a Zero-capacitor RAM (Z-RAM), etc. Exemplary ROM may include a mask ROM (MROM), a programmable ROM (PROM), a programmable erasable ROM (PEROM), an electronically erasable programmable ROM (EEPROM), a compact disc ROM (CD-ROM), and a digital versatile disk ROM, etc.

In some embodiments, the first storage space 140 may include a plurality of addresses. The first DMA controller 110 may read an input signal at each signal time and write the input signal to one of the addresses in the first storage space 140. In some embodiments, the first DMA controller 110 may periodically write the input signal to the addresses in the first storage space 140. For example, the first DMA controller 110 may periodically write the input signal to the first storage space 140 in a circular buffering manner. In the circular buffering manner, the plurality of addresses in the first storage space 140 may be connected head to tail to form a circular address space. The input signal read by the first DMA controller 110 may be written sequentially to each address in the circular address space. After the circular address space is full, data in the address to which the data has been written may be overwritten and the data may continue to be written sequentially, thereby realizing that the data is periodically written to the first storage space 140 to form the first data.

The processor 120 may process the data stored in the first storage space 140 and transmit the processed data to the second storage space 150 to form second data. For example, the processor 120 may read the first data stored in the first storage space 140, process the read first data, and write the processed first data to the second storage space 150. In some embodiments, for ease of description, a total time for the processor 120 to read the first data, process the first data, and write the processed first data to the second storage space 150 may be referred to as a time for the processor 120 to process the first data. In some embodiments, the processor 120 may include a hardware module and a software module. Merely by way of example, the hardware module may include a Digital Signal Processor (DSP) chip, a Central Processing Unit/Processor (CPU), a Microcontroller Unit (MCU), etc. In some embodiments, the processing, by the processor 120, the data stored in the first storage space 140 may include performing an analog to digital (A/D) conversion operation, an amplification operation, an encoding operation, a decoding operation, a packing operation, a caching operation, or the like, or any combination thereof. In some embodiments, the processing, by the processor 120, the data stored in the first storage space 140 may also include performing image processing, such as a filtering operation, a transforming operation, an encoding operation, a segmenting operation, an identifying operation, or a caching operation. In some embodiments, the processor 120 may process the data stored in the first storage space 140 in batches. The batch processing may refer to dividing the addresses configured to store the data in the first storage space 140 into two or more segments, using data in each segment as a batch, and sequentially processing the data in each segment sequentially. Exemplarily, in some embodiments, the processor 120 may transmit a frame of data consisting of m (m may be greater than or equal to 1) signals as a batch of data from the first storage space every N signal times to a position in the second storage space 150. In some embodiments, the m signals may be m signals that are most recently written to the first storage space. In some embodiments, N may be equal to m. For example, the first DMA controller 110 may read an input signal captured by the microphone and write the input signal to a specified position in the first storage space 140 at each signal time, and N signals may be written in the first storage space 140 after the N signal times. The processor 120 may transmit the N signals as a batch of data to the second storage space 150. In some embodiments, a data form of the second data may be the same as or different from the first data. For example, the second data may be obtained merely by packaging the first data. As another example, the second data may be obtained by amplifying the first data. As yet another example, the second data may be obtained by encoding or decoding the first data.

The second storage space 150 may be any storage device configured to store data and/or other information. Exemplary storage device may include a mass storage, a volatile read-and-write memory, a read-only memory (ROM), or the like, or any combination thereof. In some embodiments, the second storage space 150 may be similar to the first storage space 140. In some embodiments, a count of addresses in the second storage space 150 may be the same as a count of addresses in the first storage space 140, so that a mapping relationship may be formed between the first storage space 140 and the second storage space 150 to facilitate data transportation. For example, the first storage space 140 and the second storage space 150 may be segmented according to the same rule. Segments in the first storage space 140 and segments in the second storage space 150 may be in a one-to-one correspondence. The processor 120 may transmit data in a segment to a segment corresponding thereto.

The second DMA controller 130 may be configured to sequentially read the second data from the second storage space 150. In some embodiments, the second DMA controller 130 may directly control the data transmission between the second storage space 150 and the external device. For example, the second DMA controller 130 may sequentially read the second data from the second storage space 150 based on the DMA technology. In some embodiments, the external device may include a speaker. The second DMA controller 130 may output the second data to the speaker to transmit a sound captured by the microphone to a user through the speaker. In some embodiments, the external device may include a display, and the second DMA controller 130 may output the second data to the display to display the image or video obtained by the image obtaining device to the user through the display.

In some embodiments, the second DMA controller 130 may also realize the data transmission between the second storage space 150 and the external device under the control of the processor 120. For example, the second DMA controller 130 may read, under the control of the processor 120, the second data from the second storage space 150. Merely by way of example, the processor 120 may generate an instruction configured to control the second DMA controller 130 and control a data reading process of the second DMA controller 130 through the instruction. For example, the instruction may be configured to control a working time of the second DMA controller 130, so that the second DMA controller 130 may start a data reading operation at a specified time. In some embodiments, the second DMA controller 130 may read the second data from the second storage space 150 in a circular buffering manner. In the circular buffering manner, a plurality of addresses in the second storage space 150 may be connected head to tail to form a circular address space, and the second DMA controller 130 may sequentially read the second data from the circular address space.

In some embodiments, to make the first data to be read as quickly as possible after being written to the second storage space 150, when each batch of first data is being written to the second storage space 150, a data reading address of the second DMA controller 130 in the second storage space may point to the vicinity (e.g., a previous address) of the address to which the first data is being written, thereby achieving the effect of shortening the signal output delay. More descriptions regarding the making the data reading address of the second DMA controller 130 in the second storage space point to the vicinity of the address to which the first data is written may be found in FIG. 4, FIG. 5, and the related descriptions thereof, which may not be repeated herein.

Figure 2:
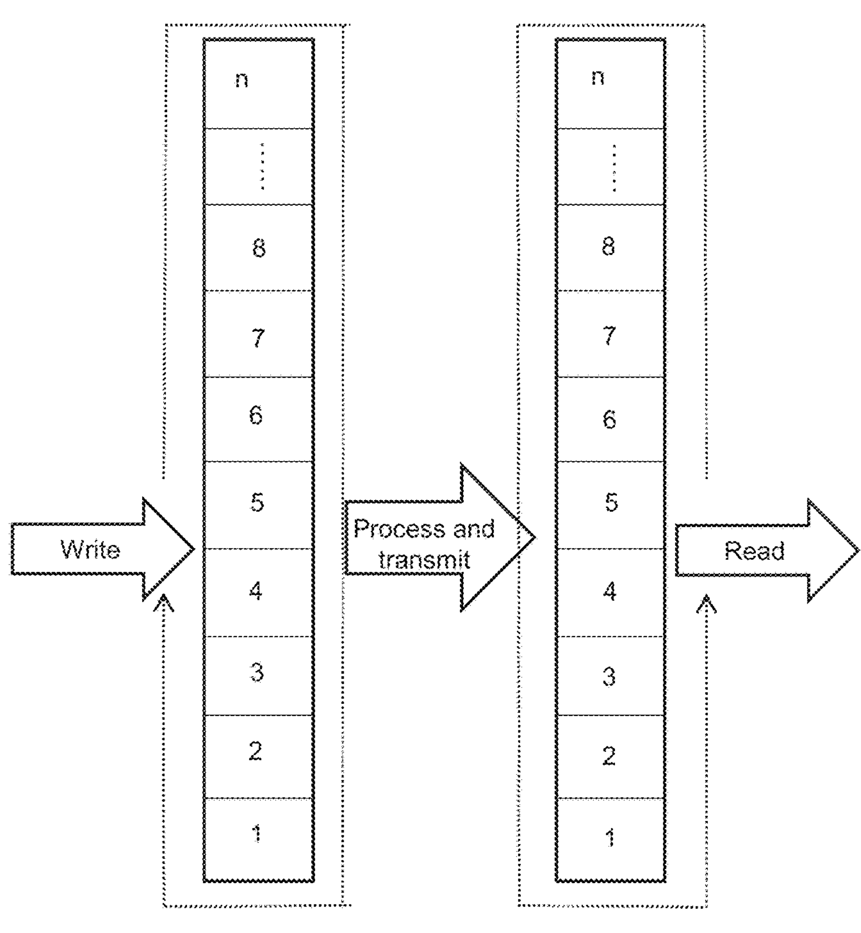
FIG. 2 is a schematic diagram illustrating a process for writing and reading a signal according to some embodiments of the present disclosure.

FIG. 2 is a schematic diagram illustrating a process for writing and reading a signal according to some embodiments of the present disclosure.

Referring to FIG. 2, in some embodiments, the first DMA controller 110 may periodically write the signal to the first storage space 140 in a circular buffering manner. Exemplarily, in some embodiments, the first storage space 140 may include n storage areas (or addresses), such as Area[1], Area[2], . . . , Area[n]. One or more bytes may be stored in each of the storage areas. An input signal obtained by the first DMA controller 110 may be written sequentially to Area[1], Area[2], . . . , Area [n], and back to Area[1], Area[2], . . . , Area[n]. In this way, old data may be sequentially overwritten, and a circular buffering may be formed. For example, when a current storage address is Area[i], if i is less than n, a latter address of Area[i] in the circular buffering may be Area[i+1]; or if i is equal to n, the latter address of Area[i] in the circular buffering may be Area[1]. As another example, when the current address is Area[i], if i is greater than 1, a previous address of Area[i] in the circular buffering may be Area[i−1]; or if i is equal to 1, the previous address may be Area[n]. Similarly, several addresses after the current address, or several addresses before it may be addressed in a way that follows the above pattern. When forward addressing reaches the head boundary (e.g., Area[1]) of the storage space, the trail boundary (e.g., Area[n]) of the storage space may be jumped to for continuous forward addressing. When backward addressing reaches the tail boundary (e.g., Area[n]) of the storage space, the head boundary (e.g., Area[1]) of the storage space may be jumped for continuous backward addressing.

It should be noted that the examples of Area[1], Area[2], . . . , Area[n] in the present disclosure are merely intended to indicate the addresses numbered in a logical order of access and do not necessarily correspond to actual physical addresses. In other words, in some embodiments, there may be any feasible mapping relationship between numbers of the logical order of access and the physical addresses of the storage medium (e.g., the first storage space 140 or the second storage space 150). Exemplarily, in some embodiments, Area[1]~Area[n] may correspond sequentially to a positive order of p[k]~p[k+n−1] in the physical address of the storage medium. In some embodiments, Area[1]~Area[n] may also correspond sequentially to a reverse order of p[k]~p[k+n−1] in the physical address of the storage medium. In some embodiments, Area[1]~Area[n] may also correspond to a certain arrangement of any n addresses in any n addresses in the p[i]~p[j+L−1] in the physical address of the storage medium, and L≥n.

In some embodiments, the input signal may include a sound signal obtained by a microphone. The first DMA controller 110 may obtain the input signal from the microphone once at a certain interval (e.g., 1 clock cycle or 2 clock cycles) and write the input signal to the first storage space 140 to form first data. A time for obtaining the input signal from the microphone once may be referred to as a signal time. In some embodiments, the input signal may include image or video frame data obtained by an image obtaining device. The first DMA controller 110 may obtain the input signal from the image obtaining device once at a certain interval (e.g., 1 clock cycle or 2 clock cycles) and write the input signal to the first storage space 140 to form the first data. A time for obtaining the input signal from the image obtaining device once may be referred to as a signal time.

In some embodiments, the processor 120 may be configured to process the first data in batches and transmit the processed first data to the second storage space 150 to form second data. For example, the processor 120 may process four consecutive signals (e.g., data[1]-data[4] stored in Area[1]-Area[4] or data[3]-data[6] stored in Area[3]-Area[6]) in the first storage space 140 at an interval of four signal times as a batch of data and transmit the processed data to the second storage space 150. It should be noted that the above is merely for the purpose of exemplary illustration. In other embodiments, the processor 120 may process the first data in the first storage space 140 at an interval of longer or shorter signal time in batches. In addition, a count of signals in each batch of data may not be limited to four. For example, in some embodiments, to improve the real-time performance of data processing, the processor 120 may process two signals stored in the first storage space 140 as a batch of data at an interval of 2 signal times and transmit the processed two signals to the second storage space 150 to form the second data.

In some embodiments, addresses of the first storage space 140 and addresses of the second storage space 150 may have a mapping relationship, and the processor 120 may write the processed first data to the second storage space 150 according to the mapping relationship. For example, Area[1] in the first storage space 140 may correspond to Area[1] in the second storage space 150. The processor 120 may write data[1] stored in Area[1] in the first storage space 140 to Area[1] in the second storage space 150 according to the mapping relationship between the first storage space 140 and the second storage space 150. As another example, Area[1]-Area[4] in the first storage space 140 may correspond to Area[1]-Area[4] in the second storage space 150. The processor 120 may write data[1]-data[4] stored in Area[1]-Area[4] in the first storage space 140 to Area[1]-Area[4] in the second storage space 150 according the mapping relationship between the first storage space 140 and the second storage space 150. As yet another example, Area[1]-Area[4] in the first storage space 140 may correspond to Area[5]-Area[8] in the second storage space 150. The processor 120 may write data[1]-data[4] stored in Area[1]-Area[4] in the first storage space 140 to Area[5]-Area[8] in the second storage space 150 according to the mapping relationship between the first storage space 140 and the second storage space 150. In some embodiments, the processor 120 may set the mapping relationship between the addresses of the first storage space 140 and the addresses of the second storage space 150, so that when each batch of first data is being written to the second storage space 150, a data reading of the second DMA controller 130 in the second storage space 150 may point to an address (e.g., a previous address) before an address where the first data is being written. In some embodiments, the processor 120 may set the mapping relationship based on a time when the first DMA controller 110 starts to work and a time when the second DMA controller 130 starts to work. In some embodiments, the processor 120 may set the mapping relationship based on a current data reading address in the second storage space 150. In some embodiments, the processor 120 may also set the mapping relationship between the addresses of the first storage space 140 and the addresses of the second storage space 150 and determine, based on the mapping relationship, the time when the first DMA controller 110 starts to work and the time when the second DMA controller 130 starts to work. More descriptions regarding the setting the mapping relationship may be found in FIG. 4, FIG. 5, and the related descriptions thereof, which may not be repeated herein.

Continuing to refer to FIG. 2, in some embodiments, the addresses of the first storage space 140 may include two or more segments arranged in sequence. For example, Area[1]-Area[4] may be used as a first segment, and Area[5]-Area[8] may be as a second segment, etc. When the processor 120 processes the first data in the first storage space 140 in batches, the data stored in each segment may be used as a batch of data. In other words, each segment of the two or more segments in the first storage space 140 may correspond to each batch when the first data is processed in batches. It should be noted that different segments may have a same length or different lengths, For example, in some embodiments, Area[1]-Area[4] may be used as the first segment, Area[5]-Area[6] may be used as the second segment, and Area[7]-Area[10] may be used as a third segment. In some embodiments, the length of the segment may also be referred to as a length of data written to the segment.

In some embodiments, the addresses of the second storage space 150 may also include two or more segments arranged in sequence. In some embodiments, the addresses of the second storage space 150 and the addresses of the first storage space 140 may be segmented according to a same segmentation mode or different segmentation modes as long as a count of addresses of segments in the second storage space 150 is the same as a count of addresses of segments in the first storage space 140. In some embodiments, addresses of a same rank in the second storage space 150 and the first storage space 140 may correspond to a same segment. For example, in the second storage space 150, Area[1]-Area[4] may be used as the first segment, and Area[5]-Area[8] may be used as the second segment. In the first storage space 140, Area[1]-Area[4] may also be used as the first segment, and Area[5]-Area[8] may also be used as the second segment. In some embodiments, addresses at the same rank in the second storage space 150 and the first storage space 140 may correspond to different segments. For example, Area[1]-Area[4] may be used as the first segment in the first storage space 140. Area[5]-Area[8] may be used as the first segment in the second storage space 150. In some embodiments, the mapping relationship between the addresses of the first storage space 140 and the addresses of the second storage space 150 may include that a current segment of the addresses of the first storage space 140 corresponds to a next segment of the addresses of the second storage space 150. For example, the first segment in the first storage space 140 may correspond to the second segment in the second storage space 150. The second segment in the first storage space 140 may correspond to a third segment in the second storage space 150. The third segment in the first storage space 140 may correspond to the first segment in the second storage space 150. Based on the mapping relationship, the processed first data may be written to a specific address in the second storage space 150. At the same time, by controlling a working time of the first DMA controller 110 and/or the third DMA controller 130, when each batch of first data is being written to the second storage space 150, the data reading address of the second DMA controller 130 in the second storage space 150 may point to the address (e.g., the previous address) before the address where the first data is being written. In such cases, the first data that is written to the second storage space 150 may be read by the second DMA controller 130 in a shortest time, thereby shortening the signal output delay and improving the real-time performance of the signal transmission.

In some embodiments, the input signal may include the sound signal obtained by the microphone. After the processor 120 obtains the second data by writing the first data in the first storage space 140 to the second storage space 150, the second DMA controller 130 may read the second data from the addresses of the second storage space 150 in a circular buffering manner and transmit the second data that are sequentially read from the second storage space 150 to a speaker. In some embodiments, the input signal may include the image or video frame data obtained by the image obtaining device. When the processor 120 obtains the second data by writing the first data in the first storage space 140 to the second storage space 150, the second DMA controller 130 may read the second data from the addresses of the second storage space 150 in a circular buffering manner and transmit the second data that are sequentially read from the second storage space 150 to a display.

In some embodiments, to make the first data to be read as quickly as possible after being written to the second storage space 150, when each batch of first data is being written to the second storage space 150, the data reading address of the second DMA controller 130 in the second storage space may always point to the address (e.g., the previous address) before the address where the first data is being written. In other words, an address where the first data is written to the second storage space 150 may always point to an address (e.g., a later address) after the data reading address of the second DMA controller 130 in the second storage space. Merely by way of example, when the current data reading address of the second DMA controller 130 in the second storage space is Area[5], the first data may be written to an area that is relatively close to Area[5] in the second storage space 150.

In some embodiments, the "address before" may refer to a plurality of addresses whose logical order of access is arranged before the current data reading address. Merely by way of example, when the current data reading address is Area[i], if i is greater than 1, the previous address of Area[i] may be Area[i−1]; or if i is equal to 1, the previous address may be Area[n]. Similarly, a plurality of addresses after the current address or a plurality of addresses before the current address may be addressed in a way that follows the above pattern. For example, the address before Area[i] may refer to a certain sub-set of a set formed by a plurality of previous addresses in an ordered queue {Area[i−1], Area[i−2], . . . , Area[1], Area[n], Area[n−1], . . . , Area[k]}. In some embodiments, a total count of addresses contained in the set formed by the plurality of previous addresses may be smaller than half of a total count of addresses in the storage space.

It should be noted that, in some embodiments, to make the first data to be read as quickly as possible after being written to the second storage space 150 to improve the operating efficiency of the system, the "address before" may refer to a previous address of the address where the first data is being written. In some embodiments, to improve the fault tolerance of the system to enhance the stability of the system, the "address before" may refer to an address within a certain range before the address where the first data is written. In some embodiments, to improve the fault tolerance of the system and ensure the operating efficiency of the system, a distance between the "address before" and the address where the first data is written may be smaller than or equal to a length of each batch of first data. Merely by way of example, the processor 120 may process four consecutive signals in the first storage space 140 as a batch of data and transmit the processed four consecutive signals to the second storage space 150 at an interval of four signal times, and the length of each batch of first data may be four, the distance between the "address before" and the address where the first data is written may be smaller than or equal to four. For example, the "address before" may refer to an address within four addresses before the address where the first data is written. As another example, the "address before" may refer to an address within three addresses before the address where the first data is written. In some embodiments, to improve the fault tolerance of the system and further improve the operating efficiency of the system, the distance between the "address before" and the address where the first data is written may be smaller than or equal to one-half of the length of each batch of first data. For example, the "address before" may refer to two addresses before the address where the first data is written. Similarly, the "address after" may refer to a later address of the current data reading address or an address within a certain range after the current data reading address. For example, the "address after" may refer to an address within four addresses after the current data reading address. As another example, the "address after" may refer to an address within three addresses after the current data reading address. As yet another example, the "address after" may refer to one address after the current data reading address. Merely by way of example, when the current data reading address of the second DMA controller 130 in the second storage space is Area[5], the address after the current data reading address may refer to any address or segment such as Area[6], Area[6]-Area[10], Area[7]-Area[11], or Area[8]-Area[13].

In some embodiments, considering that there may be second data not read by the second DMA controller 130 in a storage area after the current data reading address in the second storage space 150, at this time, if the first data is directly written to the storage area nearest to the current data reading address, the unread data may be overwritten, resulting in data loss. In some embodiments, the address where the first data is written to the second storage space 150 may be located within a certain range after the current data reading address and spaced at a certain distance from the current data reading address. Merely by way of example, when the current data reading address of the second DMA controller 130 in the second storage space is Area[5], the first data may be written to an area such as Area[7] or Area[8] or a segment such as Area[7]-Area[11] or Area[8]-Area[13], which may be determined based on the length of the first data.

A signal transmission mechanism of the system for controlling signal transmission provided by the embodiments of the present disclosure is described in detail below in connection with FIGS. 3-FIG. 5.

Figure 3:
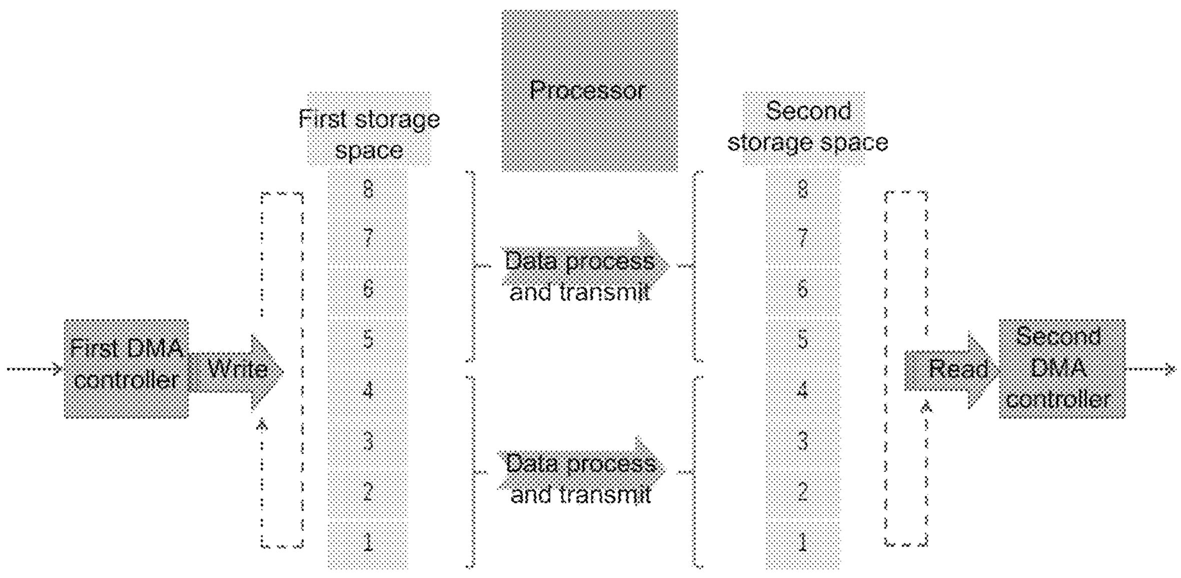
FIG. 3 is a schematic diagram illustrating a signal reading and writing mechanism according to some embodiments of the present disclosure.

FIG. 3 is a schematic diagram illustrating a signal reading and writing mechanism according to some embodiments of the present disclosure.

As shown in FIG. 3, the first storage space 140 and the second storage space 150 may include eight storage areas Area[1]-Area[8], respectively. The first DMA controller 110 may obtain a signal at each signal time and periodically write the obtained signals in a circular buffering manner to Area[1]-Area[8] in the first storage space 140 in sequence. In some embodiments, an address in the first storage space 140 and an address in the second storage space 150 may be divided into two segments, respectively. A first segment Area[1]-Area[4] in the first storage space 140 may correspond to a first segment Area[1]-Area[4] in the second storage space 150. A second segment Area[5]-Area[8] in the first storage space 140 may correspond to a second segmented Area[5]-Area[8] in the second storage space 150. Accordingly, when processing the first data in the first storage space 140 in batches and transmitting the processed first data to the second storage space 150, the processor 120 may process the first data stored in the Area[1]-Area[4] in the first storage space 140 as a batch of data and write the processed first data to Area[1]-Area[4] in the second storage space 150, and may process the first data stored in Area[5]-Area[8] in the first storage space 140 as a batch of data and write the processed first data to Area[5]-Area[8] in the second storage space 150 at an interval of four signal times.

In some embodiments, the second DMA controller 130 may usually read the second data in the second storage space 150 in a circular buffering manner, i.e., the data may be read sequentially. Due to a time difference between data writing and reading, latest data written to the second storage space 150 may need to wait for a relatively long time to be read. Merely by way of example, the first DMA controller 110 may directly control the data transmission between an external device (e.g., a microphone) and the first storage space 140 without through the processor 120, and the second DMA controller 130 may directly control the data transmission between the second storage space 150 and the external device (e.g., a speaker) without through the processor 120. At the start of the data transmission (assuming t=0), the first DMA controller 110 may start to write the first data from Area[1] in the first storage space 140, and the second DMA controller 130 may start to read the second data from the Area[1] in the second storage space 150. After 4 signal times (i.e., t=4), the processor 120 may transmit the first data from Areas[1]-Area[4] in the first storage space 140 to Area[1]-Area[4] in the second storage space 150 (assuming that a time for the processor 120 to process the first data is 0). At this time, the read address of the second DMA controller 130 may be Area[4] in the second storage space 150, and Area[5]-Area [8] in the second storage space 150 may continue to be sequentially read. In such cases, the latest data written to the first storage space 140 (e.g., the data written to Area[1] in the first storage space 140 when t=0) may need to wait for one cycle (i.e., when t=8) to be read, which results in a problem of a relatively long signal transmission delay. In addition, since the first DMA controller 110 and the second DMA controller 130 may work independently, there may be various possible changes in a relationship between the time when the first DMA controller 110 writes data and the time when the second DMA controller 130 reads the data in different data transmission processes, and time differences between data writing and reading in the different data transmission processes may be different, which results in fluctuations in the signal transmission delay and affects the stability of the system.

Figure 4:
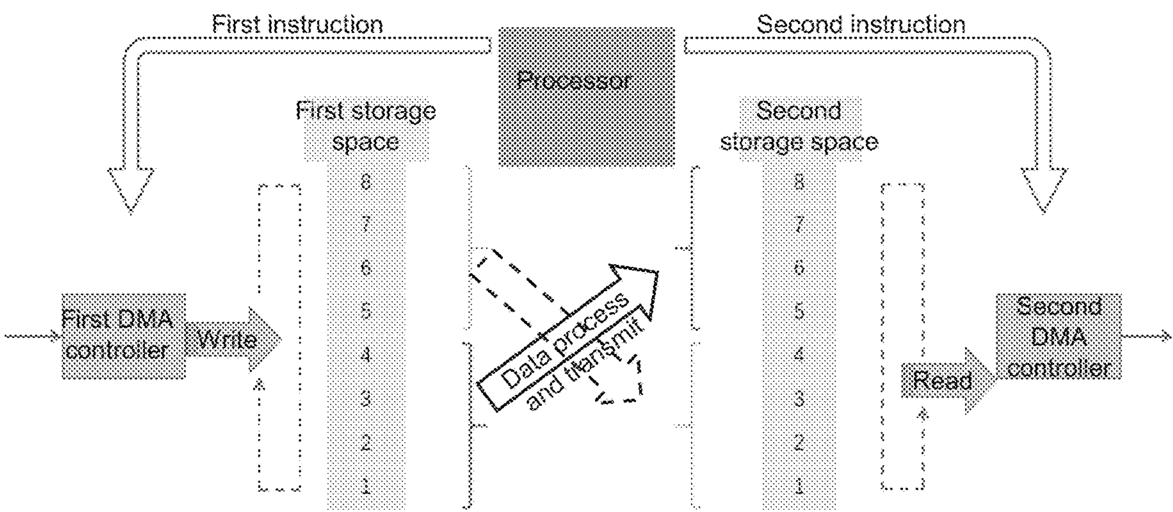
FIG. 4 is a schematic diagram illustrating a signal reading and writing mechanism according to other embodiments of the present disclosure.

FIG. 4 is a schematic diagram illustrating a signal reading and writing mechanism according to other embodiments of the present disclosure.

Referring to FIG. 4, to solve the problem of the relatively long signal transmission delay, in some embodiments, based on an operation time difference between the first DMA controller 110 and the second DMA controller 130, instructions corresponding to the operation time difference may be sent to the first DMA controller 110 and the second DMA controller 130, respectively. In such cases, when each batch of the first data is written to the second storage space 150, a data reading address of the second DMA controller 130 in the second storage space 150 may always point to an address before an address where the first data is written.

In some embodiments, the processor 120 may send a first instruction to the first DMA controller 110. The first instruction may be configured to control the first DMA controller 110 to write first sub-data to the first storage space 140 at a first time. The first sub-data refers to a signal segment consisting of one or more signals captured by a microphone. The first time refers to a base time when the system runs (e.g., t=0).

In some embodiments, the processor 120 may also send a second instruction to the second DMA controller 130. The second instruction may be configured to control the second DMA controller 130 to read second sub-data corresponding to the first sub-data in the second storage space 150 at a second time. In some embodiments, an interval between the second time and the first time may be greater than or equal to a sum of a total time for each batch of first data to be written to the first storage space 140 and a time for the processor 120 to process each batch of the first data. For example, after each batch of the first data is written to the first storage space 140, the processor 120 may transmit the batch of first data to the second storage space 150. Alternatively, the processor 120 may control a working time of the second DMA controller 130 through the second instruction, so that the data reading address of the second DMA controller 130 in the second storage space 150 may point to an address before an address where the batch of first data is written. In some embodiments, the "address before" may be a previous address of the address where the batch of first data is being written. In such cases, the second DMA controller 130 may read the second sub-data at a next signal time. The interval between the second time and the first time may be equal to the sum of the total time for each batch of the first data to be written to the first storage space 140 and the time for the processor 120 to process each batch of the first data. If the time for the processor 120 to process the first data is 0 (i.e., the processor 120 merely transmit the first data), the interval between the second time and the first time may be equal to the total time for each batch of the first data to be written to the first storage space 140. If the time for the processor 120 to process the first data is not 0, the interval between the second time and the first time may be equal to the sum of the total time for each batch of the first data to be written to the first storage space 140 and the time for the processor 120 to process each batch of the first data. In some embodiments, to increase the fault tolerance of the system and enhance the stability of the system, the "address before" may be an address within a certain range before the address where the batch of first data. Accordingly, the interval between the second time and the first time may be greater than the sum of the total time for each batch of the first data to be written to the first storage space 140 and the time for the processor 120 to process each batch of the first data. In some embodiments, the time for the processor 120 to process each batch of the first data may refer to a total time for the processor 120 to read the first data from the first storage space 140, process the first data, and write the processed first data to the second storage space 150. In some embodiments, the time for the processor 120 to process each batch of the first data may be less than or equal to the total time for each batch of the first data to be written to the first storage space 140. In such cases, the processor 120 may complete processing of a current batch of first data before a next batch of first data is all written to the first storage space 140, so that the next batch of first data may be processed in time, thereby preventing data loss caused by untimely data processing.

In some embodiments, the processor 120 may determine a mapping relationship between addresses of the first storage space 140 and addresses of the second storage space 150 and generate the first instruction and the second instruction based on the mapping relationship. The first instruction may be configured to control a time when the first DMA controller starts to work to make the first DMA controller 110 write the first sub-data to the first storage space 140 at the first time. The second instruction may be configured to control a time when the second DMA controller 130 starts to work to make the second DMA controller 130 read the second sub-data corresponding to the first sub-data in the second storage space 150 at the second time. The interval between the second time and the first time may be greater than or equal to the total time for each batch of the first data to be written to the first storage space 140. In some embodiments, the processor 120 may determine the time when the first DMA controller 110 starts to work and the time when the second DMA controller 130 starts to work based on the mapping relationship between the addresses of the first storage space 140 and the addresses of the second storage space 150, the total time for each batch of the first data to be written to the first storage space 140, and the total time for the processor 120 to process each batch of the first data. For example, the processor 120 may control, based on the mapping relationship, to advance or delay a time when the second DMA controller 130 starts through the second instruction to work relative to the first DMA controller 110 to make the data reading address of the second DMA controller 130 in the second storage space 150 point to the address before the address where the first data is written when each batch of the first data is written to the second storage space 150.

Merely by way of example, as shown in FIG. 4, the addresses of the first storage space 140 and the addresses of the second storage space 150 may each include two segments Area[1]-Area[4] and Area[5]-Area[8]. The processor 120 may determine that a first segment Area[1]-Area[4] in the first storage space 140 corresponds to a second segment Area[5]-Area[8] in the second storage space 150, and a second segment Area[5]-Area[8] in the first storage space 140 corresponds to a first segment Area[1]-Area[4] in the second storage space 150. In the data transmission control process, the processor 120 may control the first DMA controller 110 to start to work at a first initial time (e.g., at a moment t=0) through the first instruction to write the first sub-data data[1] to Area[1] of the first storage space 140 at the first time (e.g., t=1) and continue to write the signal obtained from the microphone to an address after Area[1] at each signal time in turn. At the moment t=4, the processor 120 may process, based on the mapping relationship between the addresses of the first storage space 140 and the addresses of the second storage space 150, data in the first segment Area[1]-Area[4] in the first storage space 140 as a batch of first data and transmit the batch of first data to the corresponding second segment Area[5]-Area[8] in the second storage space 150. Data written to Area[5] of the second storage space 150 may be the second sub-data.

The processor 120 may control, based on the mapping relationship between the addresses of the first storage space 140 and the addresses of the second storage space 150, the second DMA controller 130 to start to work at a second initial time (e.g., at a moment t=1) through the second instruction to read the second sub-data in Area [5] of the second storage space 150 at the second time (e.g., t=5). In some embodiments, the interval between the second time and the first time may be equal to the total time for each batch of the first data to be written to the first storage space 140. For example, as shown in FIG. 4, if the time for the processor 120 to process the first data is 0, the first segment Area[1]-Area[4] in the first storage space 140 corresponds to the second segment Area[1]-Area[4] in the second storage space 150, the second instruction may be configured to control the second DMA controller 130 to start to work at the moment t=1 to make the data reading address of the second DMA controller 130 in the second storage space 150 point to Area[4] (i.e., the address before the address where the first data is being written) when the first sub-data is written to Area[5] of the second storage space 150. Furthermore, at a next moment (i.e., a second moment t=5) when the first sub-data is written to the second storage space 150, the second DMA controller 130 may read the second sub-data in the second storage space 150. In such cases, the first sub-data written to the first storage space 140 at the moment t=1 may be read from the second storage space 150 at a moment t=5, and the time interval may be 4 signal times, which may be equal to the total time for each batch of the first data is written to the first storage space 140. In some embodiments, the interval between the second time and the first time may be equal to a sum of the total time for each batch of the first data to be written to the first storage space 140 and the time for the processor 120 to process each batch of the first data. For example, if the time for the processor 120 to process each batch of the first data is n, and the first segment Area[1]-Area[4] in the first storage space 140 corresponds to the second segment Area[5]-Area[8] in the second storage space, the second instruction may be configured to control the second DMA controller 130 to start to work at a moment t=1+n to make the data reading address of the second DMA controller 130 in the second storage space 150 point to Area[4] (i.e., the address before the address where the first data is being written) when the processed first sub-data is written to Area[5] of the second storage space 150. In such cases, the first sub-data written to the first storage space 140 at the moment t=1 may be read from the second storage space 150 at a moment t=5+n, and the time interval may be 4+n signal times, which may be equal to the sum of the total time for each batch of the first data to be written to the first storage space 140 and the time for the processor 120 to process each batch of the first data.

In some embodiments, the interval between the second time and the first time may be greater than the sum of the total time for each batch of the first data to be written to the first storage space 140 and the time for the processor 120 to process each batch of the first data. For example, in consideration of system fluctuations, etc. and to increase the fault tolerance of the system and enhance the stability of the system, when each batch of the first data is written to the second storage space 150, the address where the first data written to the second storage space 150 may point to an address after a current data reading address and be spaced apart from the current data reading address by a certain count of reserved addresses. The count of reserved addresses refers to a count of addresses spaced between the address where the first data is written and the current data reading address. For example, if the address where the first data is written is Area[5] and the current data reading address is Area[3], the count of reserved addresses may be 1. Continuing with the exemplary illustration in connection with FIG. 4, assuming that the time for the processor 120 to process each batch of the first data is n, the count of reserved addresses is d, and the first segment Area[1]-Area[4] in the first storage space 140 corresponds to the second segment Area[5]-Area[8] in the second storage space 150, the second instruction may be configured to control the second DMA controller 130 to start to work at a moment t=n+d+1 to make that the interval between the address where the first data is written to the second storage space 150 and the current data reading address is d (i.e., the data reading address of the second DMA controller 130 in the second storage space 150 points to d+1 addresses before the address where the first data is being written). In such cases, the first sub-data written to the first storage space 140 at the moment t=1 may be read from the second storage space 150 at a moment t=n+d+5, and the time interval may be n+d+4 signal times, which may be equal to a sum of the total time (i.e., 4) for each batch of the first data to be written to the first storage space 140, the time (i.e., n) for the processor 120 to process each batch of the first data, and the count (i.e., d) of reserved addresses. In some embodiments, the count of reserved addresses may be smaller than one-half of a length of each batch of the first data to ensure the operational efficiency of the system. For example, if the length of each batch of the first data is 4, the count of reserved addresses may be smaller than 2. Accordingly, the interval between the address where the first data is written to the second storage space 150 and the current data reading address may be smaller than or equal to 2.

As another example, as shown in FIG. 3, the addresses of the first storage space 140 and the addresses of the second storage space 150 may each include two segments Area[1]-Area[4] and Area[5]-Area[8]. The processor 120 may determine that the first segment Area[1]-Area[4] in the first storage space 140 corresponds to the first segment Area[1]-Area[4] in the second storage space 150, and the second segment Area[5]-Area[8] in the first storage space 140 corresponds to the second segment Area[5]-Area[8] in the second storage space 150. In the data transmission control process, the processor 120 may control the first DMA controller 110 to start to work at the first initial time (e.g., at the moment t=0) through the first instruction to write the first sub-data[1] to Area[1] of the first storage space 140 at the first time (e.g., t=1). At the moment t=4, the processor 120 may process the data in the first segment Area[1]-Area[4] of the first storage space 140 as a batch of first data and transmit the batch of first data to the corresponding the first segment Area[1]-Area[4] in the second storage space 150. Data written to Area[1] of the second storage space 150 may be the second sub-data. If the time for the processor 120 to process the first data is 0, the processor 120 may control, based on the mapping relationship between the addresses of the first storage space 140 and the addresses of the second storage space 150, the second DMA controller 130 to start to work at the second initial time (e.g., at the moment t=5) through the second instruction to make the data reading address of the second DMA controller 130 in the second storage space 150 point to an address before Area[1] when the first sub-data data[1] is written to Area[1] of the second storage space 150. Furthermore, at the next moment (i.e., the second moment, t=5) when the first sub-data is written to the second storage space 150, the second DMA controller 130 may read the second sub-data in the second storage space 150 to read the second sub-data in Area[1] of the second storage space 150 at the second time (e.g., t=5). In such cases, the first sub-data written to the first storage space 140 at the moment t=1 may be read from the second storage space 150 at the moment t=5, and the time interval may be 4 signal times, which may be equal to the total time for each batch of the first data to be written to the first storage space 140.

As yet another example, the addresses of the first storage space 140 and the addresses of the second storage space 150 may each include three segments Area[1]-Area[4], Area[5]-Area[8], and Area[9]-Area[12]. The processor 120 may determine that the first segment Area[1]-Area[4] in the first storage space 140 corresponds to a third segment Area[9]-Area[12] in the second storage space 150. In the data transmission control process, the processor 120 may control, based on the mapping relationship between the addresses of the first storage space 140 and the addresses of the second storage space 150, the second DMA controller 130 to start to work at the second initial time (e.g., at the moment t=0) through second instruction. If the time for the processor 120 to process the first data is 0, the processor 120 may control the first DMA controller 110 to start to work at the first initial time (e.g., at the moment t=3) through the first instruction to write the first sub-data data[1] to Area[1] of the first storage space 140 at the first time (e.g., t=4). At the moment t=7, the processor 120 may process data in the first segment Area [1]-Area[4] of the first storage space 140 as a batch of first data and transfer the batch of first data to the corresponding third segment Area[9]-Area[12] in the second storage space 150. At this time, the data reading address of the second DMA controller 130 in the second storage space 150 may point to Area[8]. Furthermore, at the next moment (i.e., at the second moment, t=8) when the first sub-data is written to the second storage space 150, the second DMA controller 130 may read the second sub-data in the second storage space 150, i.e., read the second sub-data in Area [9] of the second storage space 150 at the second time (e.g., t=8). In such cases, the first sub-data written to the first storage space 140 at the moment t=4 may be read from the second storage space 150 at the moment t=8, and the time interval may be four signal times, which may be equal to the total time for each batch of the first data to be written to the first storage space 140.

In other embodiments, the processor 120 may also first determine the time when the first DMA controller 110 starts to work and the time when the second DMA controller 130 starts to work and determine the mapping relationship between the addresses of the first storage space 140 and the addresses of the second storage space 150 based on the time when the first DMA controller 110 starts to work and the time when the second DMA controller 130 starts to work to make the first DMA controller 110 write the first sub-data to the first storage space 140 at the first time and the second DMA controller 130 read the second sub-data corresponding to the first sub-data in the second storage space 150 at the second time. The interval between the second time and the first time may be greater than or equal to the total time for each batch of the first data to be written to the first storage space 140. In some embodiments, the processor 120 may determine the mapping relationship between the addresses of the first storage space 140 and the addresses of the second storage space 150 based on the time when the first DMA controller 110 starts to work and the time when the second DMA controller 130 starts to work, the total time for each batch of the first data to be written to the first storage space 140, and the total time for the processor 120 to process each batch of the first data.

Merely by way of example, the first DMA controller 110 and the second DMA controller 130 may both starts to work at the first initial time (e.g., at the moment t=0). The first DMA controller 110 may write the first sub-data data[1] to Area[1] of the first storage space 140 at the first time (e.g., t=1) and write Area[1]-Area[4] of the first storage space 140 at the moment t=4. The processor 120 may determine, based on the time when the first DMA controller 110 and the second DMA controller 130 starts to work and the time for Area[1]-Area[4] to be processed, the first mapping relationship between the addresses of the storage space 140 and the addresses of the second storage space 150. If the time for the processor 120 to process the first data is 0, the processor 120 may determine the mapping relationship between the addresses of the first storage space 140 and the addresses of the second storage space 150, including that Area[1]-Area [4] of the first storage space 140 corresponds to Area[6]-Area[9] of the second storage space 150. In such cases, at the moment t=4, the first sub-data may be written to Area[6] of the second storage space 150. At this time, the data reading address of the second DMA controller 130 may point to Area[5]. Furthermore, at the next moment (i.e., at the second moment, t=5) when the first sub-data is written to the second storage space 150, the second DMA controller 130 may read the second sub-data in the second storage space 150.

According to the method illustrated in the present disclosure, the time when the first DMA controller 110 starts to work and the time when the second DMA controller 130 starts to work and/or the mapping relationship between the addresses of the first storage space 140 and the addresses of the second storage space 150 may be controlled, which may reduce the relatively large data transmission delay caused by the problem of time difference in data writing, transmission, and reading and stabilize the data transmission delay within a specified range of value, thereby avoiding or reducing fluctuations in the data transmission delay and improving the stability of the system.

It should be noted that the above descriptions regarding the signal reading and writing mechanism are merely provided for the purpose of illustration and are not intended to limit the scope of the present disclosure. For those skilled in the art, arbitrary changes or modifications may be made based on the present disclosure. In some embodiments, the first storage space 140 and the second storage space 15 may each include three or more segments. To make the data reading address of the second DMA controller 130 in the second storage space 150 point to the address before the address where the first data is being written when each batch of the first data is written to the second storage space 150, data stored in a current segment of the first storage space 140 may be written to a next segment of the second storage space 150. For example, the data stored in a first segment of the second storage space 140 may be written to a second segment of the second storage space 150, the data stored in the second segment of the first storage space 140 may be written to a third segment of the storage space 150, etc. In some embodiments, to make the first data be read as quickly as possible after being written to the second storage space 150, thereby enhancing the operational efficiency of the system, "address before" may refer to a previous address of the address where the first data is being written. In some embodiments, in order to improve the fault tolerance of the system and enhance the stability of the system, the "address before" may also refer to an address within a certain range before the address where the first data is written. Accordingly, the second instruction may be modified to modify the time when the second DMA controller 130 starts to work to make the data reading address of the second DMA controller 130 in the second storage space 150 point to another address before the address where the first data is being written.

In some embodiments, the first data read and/or processed by the processor 120 from the first storage space 140 and the first data transmitted to the second storage 150 may be a same batch of data in the transmission process. For example, after reading a batch of the first data from the first storage space 140, the processor 120 may process (e.g., amplify or encode) the batch of the first data and transmit the batch of the first data to the second storage space 150 immediately. In some embodiments, the first data read and/or processed by the processor 120 from the first storage space 140 and the first data transmitted to the second storage 150 may be different batches of data in the transmission process. For example, after reading a batch of the first data from the first storage space 140, the processor 120 may cache the batch of the first data before transmitting the batch of the first data to the second storage space 150. Merely by way of example, the processor 120 may have functions of writing, storage, and reading internally. The batch of first data read from the first storage space 140 may be stored in the processor 120 in a circular buffering manner, read in a circular buffering manner after being processed by the processor 120, and transmitted to the second storage space 150. In such cases, in the transmission process, the processor 120 may cache a current batch of first data read from the first storage space 140 and transmit other batches of first data cached before to the second storage space 150.

Figure 5:
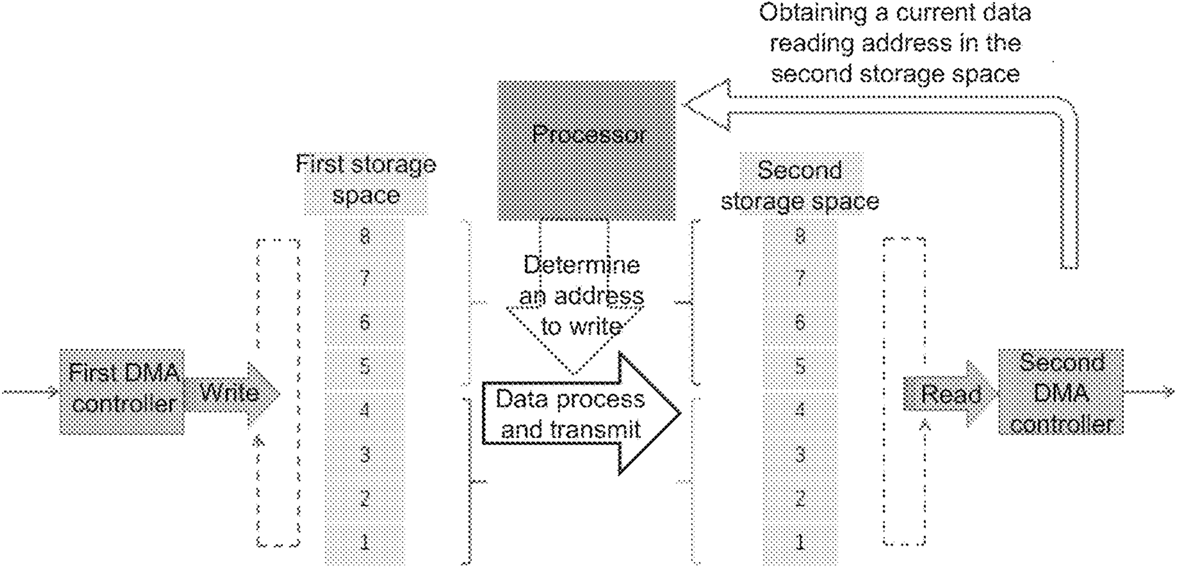
FIG. 5 is a schematic diagram illustrating a signal reading and writing mechanism according to other embodiments of the present disclosure.

FIG. 5 is a schematic diagram illustrating a signal reading and writing mechanism according to other embodiments of the present disclosure.

Referring to FIG. 5, to solve the problem of the relatively long signal delay, in some embodiments, an address where each batch of first data is written to the second storage 150 may also be determined based on a current data reading address in the second storage 150.

In some embodiments, the processor 120 may obtain the current data reading address in the second storage 150 from the second DMA controller 130 and determine, based on the current data reading address, the address where each batch of the first data is written to the second storage 150. Merely by way of example, if the current data reading address in the second storage space 150 is Area[x], and the current batch of first data to be written to the second storage space 150 includes a signal(s), a corresponding address where the current data to be written to the second storage space 150 is written to the second storage space 150 may be determined to be Area[x+1]-Area[x+a]. In such cases, when each batch of the first data is written to the second storage space 150, the data reading address of the second DMA controller 130 in the second storage space 150 may point to an address before an address where the first data is being written such that the signal is read immediately after being written to the second storage space 150. For example, as shown in FIG. 5, the processor 120 may communicate with the second DMA controller 130 and obtain that the current data reading address in the second storage space 150 is Area[4]. At this time, the processor 120 may process and transmit the first data stored in Area[1]-Area[4] of the first storage space 140 to Area[5]-Area[8] of the second storage space 150 to make the second DMA controller 130 read the data stored in Area[5] at a next signal time, thereby reducing the signal delay.

In some embodiments, a time for the processor 120 to write each batch of the first data to the second storage space 150 may be greater than 0. In such cases, the processor 120 may determine the address where each batch of the first data is written to the second storage space 150 based on the current data reading address and the time for the processor 120 to write each batch of the first data to the second storage space 150. Merely by way of example, if the current data reading address in the second storage space 150 is Area[x], the time for the processor 120 to write each batch of the first data to the second storage space 150 is y, and the current batch of first data to be written to the second storage space 150 includes a signal(s), a corresponding address where the current data to be written to the second storage space 150 is written to the second storage space 150 may be determined to be Area[x+y+1]-Area[x+y+a].

In some embodiments, considering that there may be second data that is not read by the second DMA controller 130 in a storage area of the second storage space 150 that is located after the current data reading address, at this time, if the first data is directly written to a storage area that is closest after the current data, unread data may be overwritten, which may result in data loss. In some embodiments, when the current data reading address in the second storage space 150 is Area[x], the time for the processor 120 to write each batch of the first data to the second storage space 150 is y, and the current batch of first data to be written to the second storage space 150 includes a signal(s), a corresponding address where the current data to be written to the second storage space 150 is written to the second storage space 150 may be determined to be Area[x+y+2]-Area[x+y+a+1], Area [x+y+3]-Area[x+y+a+2], etc.

According to the method illustrated in the present disclosure, the address where each batch of the first data is written to the second storage space 150 based on the current data reading address in the second storage space 150 may be determined, which may reduce the relatively large data transmission delay caused by the problem of time difference in data writing, transmission, and reading and stabilize the data transmission delay within a specified range of value, thereby avoiding or reducing fluctuations in the data transmission delay and improving the stability of the system.

It should be noted that the descriptions regarding the system for controlling signal transmission 100 are provided for the purpose of exemplification and illustration, and not intended to limit the scope of application of the present disclosure. For those skilled in the art, various modifications and changes may be made to the system 100 for controlling signal transmission under the guidance of the present disclosure. However, these modifications and changes remain within the scope of the present disclosure. For example, in some embodiments, the first storage space 140 and the second storage space 150 may be different portions of a same storage device. As another example, in some embodiments, the processor 120 may be replaced with other components having data processing functions. As yet another example, in some embodiments, when the processor 120 processes the first data in the first storage space 140 in batches, the each batch of data may have a different amount or may be process in a different way.

The basic concept has been described above. Obviously, for those skilled in the art, the above detailed disclosure is only an example, and does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for controlling signal transmission, comprising:

a first direct memory access (DMA) controller configured to write a signal to a first storage space to form first data;

a processor configured to process the first data in batches and transmit the processed first data to a second storage space to form second data, wherein the processing the first data in batches includes performing at least one of an analog to digital (A/D) conversion operation, an amplification operation, an encoding operation, a decoding operation, a packing operation, or a caching operation on the first data in batches, the first storage space includes addresses and the second storage device includes addresses, the addresses of the first storage space and the addresses of the second storage space have a mapping relationship, and the processor writes the processed first data to the second storage space according to the mapping relationship, the addresses of the first storage space have two or more segments arranged in sequence, each segment of the two or more segments corresponding to each batch when the first data is processed in batches, the addresses of the second storage space have two or more segments arranged in sequence, and the mapping relationship includes a current segment of the addresses of the first storage space corresponding to a next segment of the addresses of the second storage space; and a second DMA controller configured to sequentially read, in a circular buffering manner, the second data from an address of the second storage space, wherein when each batch of first data is being written to the second storage space, an address where the batch of first data is written to the second storage space points to an address in the second storage space after a current data reading address of the second DMA controller in the second storage space.

2. The system for controlling signal transmission of claim 1, wherein the first DMA controller periodically writes the signal to the first storage space in a circular buffering manner.

3. The system for controlling signal transmission of claim 1, wherein the processor is further configured to:

send a first instruction to the first DMA controller to control the first DMA controller to write first sub-data to the first storage space at a first time; and send a second instruction to the second DMA controller to control the second DMA controller to read second sub-data corresponding to the first sub-data in the second storage space at a second time, wherein an interval between the second time and first time is greater than or equal to a total time for each batch of first data to be written to the first storage space.

4. The system for controlling signal transmission of claim 3, wherein the interval between the second time and the first time is greater than or equal to a sum of the total time for the each batch of first data to be written to the first storage space and a time for the processor to process the each batch of first data.

5. The system for controlling signal transmission of claim 3, wherein the second instruction is configured to control the second DMA controller to advance or delay a time when the second DMA controller starts to work relative to the first DMA controller.

6. The system for controlling signal transmission of claim 1, wherein the processor is configured to:

determine a first time when the first DMA controller starts to write a first sub-data to the first storage space and a second time when the second DMA controller starts to read a second sub-data of the second data corresponding to the first sub-data from the address of the second storage space, respectively;

determine a mapping relationship between addresses of the first storage space and addresses of the second storage space based on the first time and the second time; and write the processed first data to the second storage space according to the mapping relationship.

7. The system for controlling signal transmission of claim 2, wherein before the each batch of first data is written to the second storage space, the processor reads a current data reading address of the second storage space and determines, based on the current data reading address, a writing address where the each batch of first data is to be written.

8. The system for controlling signal transmission of claim 1, wherein the signal includes a sound signal obtained by a microphone, and the second DMA controller transmits the second data that are sequentially read from the second storage space to a speaker.

9. The system for controlling signal transmission of claim 1, wherein the signal includes an image obtained by an image obtaining device, and the second DMA controller transmits the second data that are sequentially read from the second storage space to a display.

10. The system for controlling signal transmission of claim 9, wherein the processing the first data in batches includes performing at least one of a filtering operation, a transforming operation, an encoding operation, a segmenting operation, an identifying operation, or a caching operation on the first data.

11. The system for controlling signal transmission of claim 1, wherein a distance between the current data reading address of the second DMA controller in the second storage space and the address where the batch of first data is written to the second storage space is smaller than or equal to a length of the each batch of first data.

12. The system of claim 1, wherein to process the first data in batches and transmit the processed first data to the second storage space to form the second data, the processor is further configured to:

obtain data from different addresses of the first storage space as a batch of data, the multiple signals being obtained at different time points;

transmit the batch of data to addresses in the second storage space.

13. The system of claim 1, wherein each of addresses of the first storage space corresponds to one of addresses of the second storage space, and the processor writes the processed first data from an address of the first storage space to an address of the second storage space corresponding to the address of the first storage space.

14. The system of claim 1, wherein the address where the batch of first data is written to the second storage space points to an address in the second storage device that is spaced apart from the data reading address of the second DMA controller in the second storage space by a certain count of reserved addresses.

15. The method of claim 7, wherein an interval between the current data reading address and the writing address where the each batch of first data is to be written is greater than a time for the processor to write each batch of the first data.

16. The method of claim 1, wherein the first data processed by the processor from the first storage space and the first data transmitted to the second storage are different batches of data in the transmission process.

* * * * *